United States Patent
Lin et al.

(10) Patent No.: US 10,791,094 B2
(45) Date of Patent: Sep. 29, 2020

(54) METHOD AND SYSTEM FOR BIDIRECTIONAL TRANSPARENT PROXYING

(71) Applicant: WANGSU SCIENCE & TECHNOLOGY CO., LTD., Shanghai (CN)

(72) Inventors: Peng Lin, Shanghai (CN); Zhaoxin Lu, Shanghai (CN); Xun Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 212 days.

(21) Appl. No.: 15/774,046

(22) PCT Filed: Aug. 25, 2017

(86) PCT No.: PCT/CN2017/099155
§ 371 (c)(1),
(2) Date: May 7, 2018

(87) PCT Pub. No.: WO2019/037120
PCT Pub. Date: Feb. 28, 2019

(65) Prior Publication Data
US 2019/0379641 A1    Dec. 12, 2019

(30) Foreign Application Priority Data
Aug. 22, 2017    (CN) .......................... 2017 1 0726370

(51) Int. Cl.
*H04L 29/08*  (2006.01)
*H04L 29/06*  (2006.01)
*H04L 29/12*  (2006.01)

(52) U.S. Cl.
CPC ...... *H04L 63/0281* (2013.01); *H04L 61/2007* (2013.01); *H04L 63/0236* (2013.01); *H04L 63/0263* (2013.01); *H04L 67/2814* (2013.01)

(58) Field of Classification Search
CPC .................. H04L 63/0281; H04L 61/2007
(Continued)

(56) References Cited

U.S. PATENT DOCUMENTS 7,954,144 B1   5/2011   Ebrahimi et al.
2015/0207846 A1   7/2015   Koninklijke et al.
(Continued)

FOREIGN PATENT DOCUMENTS

CN    1460347 A    12/2003
CN    106534396 A   3/2017
(Continued)

OTHER PUBLICATIONS

The European Patent Office (EPO) The Extended European Search Report for PCT/CN2017/099155 (17879650.4), dated Nov. 6, 2018, 10 Pages.
(Continued)

*Primary Examiner* — Anthony D Brown
(74) *Attorney, Agent, or Firm* — Anova Law Group, PLLC

(57) ABSTRACT

A method for bidirectional transparent proxying, includes: configuring, by a first proxy end, iptables rules based on a protocol type of a requesting-end-requested packet, and receiving, by the first proxy end, the requesting-end-requested packet that is guided based on the iptables rules; sending, by the first proxy end, the requesting-end-requested packet and the protocol type of the requesting-end-requested packet to a second proxy end; based on the requesting-end-requested packet and the protocol type of the requesting-end-requested packet, sending, by the second proxy end, the (Continued)

requesting-end-requested packet to an acknowledging end; by configuring ospf service, iptables rules and routing rules, guiding and receiving, by the second proxy end, an acknowledging-end-responded packet, and sending, by the second proxy end, the acknowledging-end-responded packet to the first proxy end; sending, by the first proxy end, the received acknowledging-end-responded packet to the requesting end.

14 Claims, 2 Drawing Sheets

(58) Field of Classification Search
USPC .............................................................. 726/1
See application file for complete search history.

(56) References Cited

U.S. PATENT DOCUMENTS

2016/0119903 A1* 4/2016 Skog .................. H04L 65/4084
370/329
2016/0269441 A1* 9/2016 Savage ............... H04L 63/1433

FOREIGN PATENT DOCUMENTS

| CN | 106911778 A | 6/2017 |
| CN | 107026795 A | 8/2017 |
| WO | 2007134082 A2 | 11/2007 |

OTHER PUBLICATIONS

Daniel Kiracofe, Transparent Proxy with Linux and Squidmini-HOWTO, Aug. 1, 2002, XP002785879, pp. 1-10.

* cited by examiner

METHOD AND SYSTEM FOR BIDIRECTIONAL TRANSPARENT PROXYING

CROSS-REFERENCES TO RELATED APPLICATIONS

This application is a national phase entry under 35 U.S.C § 371 of International Application No. PCT/CN2017/099155, filed on Aug. 25, 2017, which claims priority of Chinese Patent Application No. 201710726370.7, filed with the State Intellectual Property Office of P. R. China on Aug. 22, 2017, the entire contents of all of which are incorporated herein by reference.

FIELD OF THE DISCLOSURE

The present disclosure relates to the technical field of computer communication and, more particularly, relates to a method and a system for bidirectional transparent proxying.

BACKGROUND

In certain network scenarios, a user often needs to use a proxy to visit network or some special service websites normally. Therefore, various types of proxies with different purposes emerge, such as HTTP (HyperText Transfer Protocol) proxy, FTP (File Transfer Protocol) proxy, SSL (Secure Sockets Layer) proxy, and some web proxies. However, these proxies all serve particular application protocols, and the user has to specify the service address and service port of the proxy, and also specify the application protocols that correspond to designated accessing behaviors. The user needs to perform complicated deployment and configuration to realize proxying. That is, the proxy is not transparent to the user.

To solve the issue of the proxy being not transparent to the user, the conventional solution allows a requesting end to establish a TCP (Transmission Control Protocol) connection with a proxy server by hijacking the TCP_SYN request packet of the user, and further uses the proxy server to establish a connection with the server, such that proxying is realized. Accordingly, the user no longer needs to pay close attention to information such as the service port of the application protocol and the service port of the proxy server to achieve the goal of making the proxy transparent to the user. However, this solution is only applicable to TCP connection protocol, and meanwhile, because the source IP address is the address of the proxy server itself but not the source IP address of the original request when the proxy performs TCP connection with the server, the request through a proxy will not receive correct response under certain scenarios where only network segment of private users is allowed to access specialized network. That is, the proxy is not transparent to the server.

In another aspect, directed towards some situations where only certain application protocols are valid, some of current socks proxies, such as shadowsocks, can implement proxying of most ip packets, but they are only transparent to the server but not to the user. Thus, the user needs to install some requesting ends and perform certain configuration to realize proxying.

As such, the conventional proxying method has the issue of not being applicable to full ip protocols, as well as the one-way transparent issue of being only transparent to the user or being only transparent to the server under full ip protocol or specialized network.

BRIEF SUMMARY OF THE DISCLOSURE

To solve issues in existing technologies, embodiments of the present disclosure provide a method and a system for bidirectional transparent proxying. The technical solutions are as follows.

In one aspect, a method for bidirectional transparent proxying is provided, including:
  configuring, by a first proxy end, iptables rules based on the protocol type of a requesting-end-requested packet, and receiving, by the first proxy end, the requesting-end-requested packet that is guided based on the iptables rules;
  sending, by the first proxy end, the requesting-end-requested packet and the protocol type of the requesting-end-requested packet to a second proxy end;
  based on the requesting-end-requested packet and the protocol type of the requesting-end-requested packet, sending, by the second proxy end, the requesting-end-requested packet to an acknowledging end, where a requesting-end ip address and a requesting-end port in the requesting-end-requested packet are used as a source ip address and a source port;
  by configuring ospf (Open Shortest Path First) service, iptables rules and routing rules, guiding and receiving, by the second proxy end, an acknowledging-end-responded packet, and sending, by the second proxy end, the acknowledging-end-responded packet to the first proxy end;
  sending, by the first proxy end, the received acknowledging-end-responded packet to the requesting end.

Further, the protocol type of the requesting-end-requested packet may be a connection-oriented protocol type, steps of configuring, by a first proxy end, iptables rules based on the protocol type of a requesting-end-requested packet, and receiving, by the first proxy end, the requesting-end-requested packet that is guided based on the iptables rules specifically includes:
  configuring, by the first proxy end, the iptables rules based on the connection-oriented protocol type, and utilizing, by the first proxy end, a redirect mechanism of NetFilter to redirect the requesting-end-requested packet to the first proxy end, thereby establishing a connection-oriented connection relationship between the first proxy end and the requesting end.

Further, the protocol type of the requesting-end-requested packet may be a connectionless protocol type, and steps of configuring, by a first proxy end, iptables rules based on the protocol type of the requesting-end-requested packet, and receiving, by the first proxy end, the requesting-end-requested packet that is guided based on the iptables rules specifically includes:
  configuring, by the first proxy end, the iptables rules based on the connectionless protocol type, utilizing, by the first proxy end, a mark mechanism of the NetFilter to mark the requesting-end-requested packet, and configuring, by the first proxy end, routing rules to guide the marked requesting-end-requested packet to the first proxy end.

Further, when the protocol type of the requesting-end-requested packet is the connectionless protocol type, steps of configuring, by a first proxy end, iptables rules based on the protocol type of the requesting-end-requested packet, and receiving, by the first proxy end, the requesting-end-requested packet that is guided based on the iptables rules may also include:

when the connectionless protocol type is a UDP protocol type, utilizing, by the first proxy end, a tproxy mechanism of the NetFilter to redirect the requesting-end-requested packet, marking, by the first proxy end, the redirected requesting-end-requested packet, and configuring, by the first proxy end, routing rules to guide the marked requesting-end-requested packet to the first proxy end.

Further, steps of, based on the requesting-end-requested packet and the protocol type of the requesting-end-requested packet, sending, by the second proxy end, the requesting-end-requested packet to an acknowledging end, where a requesting-end ip address and a requesting-end port in the requesting-end-requested packet are used as a source ip address and a source port, specifically includes:

when the protocol type of the requesting-end-requested packet is a connection-oriented protocol type, based on the connection-oriented protocol type, utilizing, by the second proxy end, an ip_transparent option of socket to establish a connection-oriented connection relationship with the acknowledging end, where the requesting-end ip address and the requesting-end port in the requesting-end-requested packet are used as the source ip address and the source port; and sending, by the second proxy end, the requesting-end-requested packet to the acknowledging end;

or, when the protocol type of the requesting-end-requested packet is a connectionless protocol type, based on the connectionless protocol type, utilizing, by the second proxy end, the ip_transparent option of the socket to directly send the requesting-end-requested packet to the acknowledging end, where the requesting-end ip address and the requesting-end port in the requesting-end-requested packet are used as the source ip address and the source port.

Further, when the protocol type of the acknowledging-end-responded packet is a connection-oriented protocol type, steps of sendin the first proxy end, the received acknowledging-end-responded packet to the requesting end specifically includes:

through the connection relationship between the first proxy end and the requesting end, sending, by the first proxy end, the received acknowledging-end-responded packet to the requesting end.

Further, when the protocol type of the acknowledging-end-responded packet is a connectionless protocol type, steps of sending, by the first proxy end, the received acknowledging-end-responded packet to the requesting end specifically includes:

through raw socket, sending, by the first proxy end, the received acknowledging-end-responded packet to the requesting end.

In another aspect, a system for bidirectional transparent proxying is provided, including: a first proxy end and a second proxy end. The first proxy end includes a first configuration module and a second configuration module, and the second proxy end includes a third configuration module and a fourth configuration module.

The first configuration module is configured for configuring iptables rules based on the protocol type of a requesting-end-requested packet and receiving the requesting-end-requested packet that is guided based on the iptabiles rules.

The second configuration module is configured for sending the requesting-end-requested packet and the protocol type of the requesting-end-requested packet to the second proxy end.

The third configuration module is configured for, based on the requesting-end-requested packet and the protocol type of the requesting-end-requested packet, sending the requesting-end-requested packet to an acknowledging end, where a requesting-end ip address and a requesting-end port in the requesting-end-requested packet are used as a source ip address and a source port.

The fourth configuration module is configured for guiding and receiving an acknowledging-end-responded packet by configuring ospf service, iptables rules and routing rules, and sending the acknowledging-end-responded packet to the first proxy end.

The first configuration module is further configured for sending the acknowledging-end-responded packet to the requesting end.

Further, when the protocol type of the requesting-end-requested packet is a connection-oriented protocol type, the first configuration module is further configured for configuring the iptables rules based on the connection-oriented protocol type, and utilizing a redirect mechanism of NetFilter to redirect the requesting-end-requested packet to the first proxy end, thereby establishing a connection-oriented connection relationship between the first proxy end and the requesting end.

Further, when the protocol type of the requesting-end-requested packet is a connectionless protocol type, the first configuration module is further configured for configuring the iptables rules based on the connectionless protocol type, utilizing a mark mechanism of the NetFilter to mark the requesting-end-requested packet, and configuring routing rules to guide the marked requesting-end-requested packet to the first proxy end.

Further, when the connectionless protocol type is a UDP protocol type, the first configuration module is further configured for utilizing a tproxy mechanism of the NetFilter to redirect the requesting-end-requested packet, marking the redirected requesting-end-requested packet, and configuring routing rules to guide the marked requesting-end-requested packet to the first proxy end.

Further, when the protocol type of the requesting-end-requested packet is a connection-oriented protocol type, the third configuration module is further configured for, based on the connection-oriented protocol type, utilizing an ip_transparent option of the socket to establish a connection-oriented connection relationship with the acknowledging end, where the requesting-end ip address and the requesting-end port in the requesting-end-requested packet are used as the source ip address and the source port; and sending the requesting-end-requested packet to the acknowledging end.

When the protocol type of the requesting-end-requested packet is a connectionless protocol type, the third configuration module is further configured for, based on the connectionless protocol type, utilizing the ip_transparent option of the socket to directly send the requesting-end-requested packet to the acknowledging end, where the requesting-end ip address and the requesting-end port in the requesting-end-requested packet are used as the source ip address and the source port.

Further, when the protocol type of the acknowledging-end-responded packet is the connection-oriented protocol type, the first configuration module is further configured for, through the connection relationship between the first proxy end and the requesting end, sending the received acknowledging-end-responded packet to the requesting end.

Further, when the protocol type of the acknowledging-end-responded packet is a connectionless protocol type, the first configuration module is further configured for, through raw socket, sending the received acknowledging-end-responded packet to the requesting end.

Beneficial effects brought about by the technical solutions of the present disclosure are as follows.

By differentiating different connection protocol types and adopting packet-processing approaches corresponding to the connection protocols, the present disclosure achieves the objective of making the proxy to be transparent to both the client and server under the full ip protocol formed by the connection-oriented protocol and connectionless protocol.

By using the requesting-end ip address and the requesting-end port in the requesting-end-requested packet as the source ip address and the source port, the proxy enables the acknowledging end to believe that the access request is from the requesting end, thereby achieving the objective of making the proxy to be transparent to the server in specified network.

BRIEF DESCRIPTION OF THE DRAWINGS

To more clearly illustrate technical solutions of the present disclosure, accompanying drawings used in descriptions of embodiments hereinbelow are introduced briefly. Obviously, the accompanying drawings described hereinafter are only some embodiments of the present disclosure, and for those ordinarily skilled in the relevant art, other drawings may be obtained from these accompanying drawings without creative labor.

DETAILED DESCRIPTION

To make the objective, technical solutions and advantages of the present disclosure clearer, embodiments of the present disclosure are described in more details with reference to the accompanying drawings.

Embodiment 1

Figure 1:
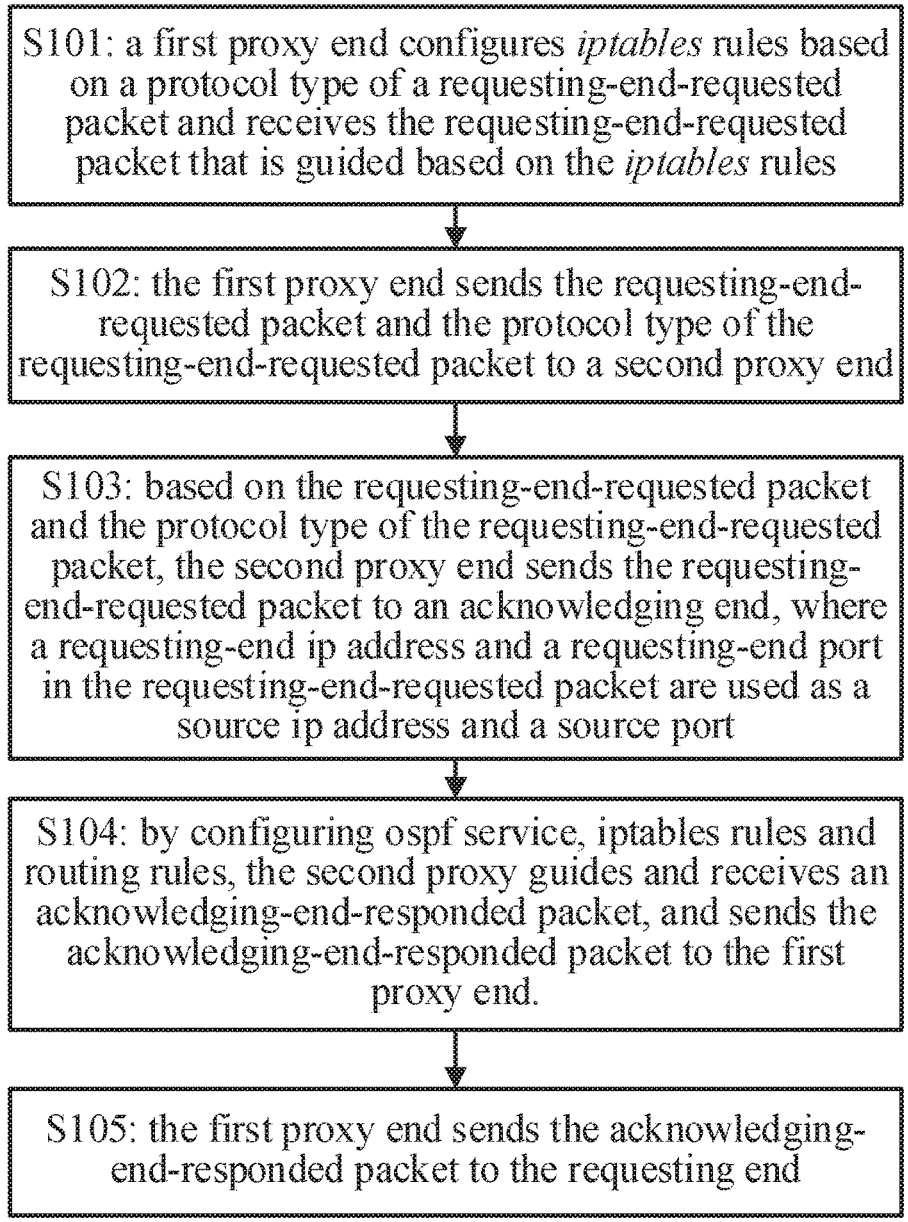
FIG. 1 illustrates a flow chart showing steps of a method for bidirectional transparent proxying according to Embodiment 1 of the present disclosure.

The present disclosure provides a method for bidirectional transparent proxying. Referring to FIG. 1, the method includes following steps.

At S101: a first proxy end configures iptables rules based on the protocol type of a requesting-end-requested packet and receives the requesting-end-requested packet that is guided based on the iptables rules (the requesting-end-requested packet may refer to a packet requested by a requesting end).

In some embodiments, the protocol type includes a connection-oriented protocol type (e.g., TCP type), a connectionless protocol (e.g., User Datagram Protocol, UDP) type, and an ICMP (Internet Control Message Protocol) type.

In some embodiment, for the connection-oriented protocol type, at Step S101: the first proxy end configures iptables rules based on the connection-oriented protocol type, and utilizes a redirect mechanism of NetFilter to redirect the requesting-end-requested packet to the first proxy end, thereby establishing a connection-oriented connection relationship between the first proxy end and the requesting end.

Specifically, iptables is an ip information packet filtering syste rr integrated with Linux kernel, and such system facilitates the Linux system to better control the ip information packet filtering and the firewall configuration. The iptables works in the kernel, and is configured to set, maintain, and check the ip packet filtering rules of the Linux kernel, and to form the rules into a list, thereby realizing a specific access-control function. The rules defined by the iptables may be read by the NetFilter (network filter) in the kernel space.

The first proxy end may configure the iptables rules based on the connection-oriented protocol type, and use the redirect mechanism of the NetFilter to redirect the client-requested packet to a listening port of the first proxy end through redir ports, thereby establishing a connection-oriented connection relationship of first proxy end-requesting end between the first proxy end and the requesting end. For example, when the connection-oriented protocol type is the TCP type, through the TCP protocol stack of the kernel, the first proxy end automatically completes the three-way handshake with the requesting end. While completing the establishment of a TCP connection relationship of first proxy end-requesting end, the connection-tracking information of the connection relationship of first proxy end-requesting end also needs to be established, thereby facilitating subsequent receiving of the acknowledging-end-responded packet (the acknowledging-end-responded packet may refer to a packet responded by an acknowledging end).

In some embodiments, for the connectionless protocol type, at Step S101: the first proxy end configures iptables rules based on the connectionless protocol type, utilizes a mark mechanism of the NetFilter to mark the requesting-end-requested packet, and configures routing rules to guide the marked requesting-end-requested packet to the first proxy end.

Specifically, the first proxy end configures the iptables rules based on the connectionless protocol type and uses the mark mechanism of the NetFilter to mark the requesting-end-requested packet. The first proxy end further configures the routing rules to allow the marked packet to use a designated routing table for routing. Further, the routing rules are added to the designated routing table, such that the marked packet is guided to the first proxy end. The connection-tracking information of the first proxy end and the requesting end is also established, which facilitates the subsequent receiving of the acknowledging-end-responded packet.

It should be noted that, when the protocol type is the UDP protocol type, before marking the requesting-end-requested packet, the first proxy end further redirects the requesting-end-requested packet through the tproxy mechanism of the NetFilter. Further, the first proxy end marks the redirected requesting-end-requested packet and configures the routing rules to allow the marked packet to use the designated routing table for routing. The routing rules are further added to the designated routing table, and the marked requesting-end-requested packet is guided to the first proxy end.

By differentiating different connection protocol types and adopting packet-processing approaches corresponding to the connection protocols, the present disclosure achieves the objective of making the proxy to be transparent to the user and server under the full ip protocol formed by the connection-oriented protocol and connectionless protocol.

At S102: the first proxy end sends the requesting-end-requested packet and the protocol type of the requesting-end-requested packet to a second proxy end.

Specifically, the first proxy end needs to establish a connection relationship with the second proxy end, and through the connection relationship, sends the requesting-end-requested packet and the protocol type of the requesting-end-requested packet to the second proxy end. Further, connection-tracking information of such connection relationship needs to be established, and a mapping relationship between such connection relationship and the aforementioned connection-tracking information of the first proxy end and the requesting end needs to be established and saved. Accordingly, the subsequent receiving of the acknowledging-end-responded packet may become easier.

At S103: based on the requesting-end-requested packet and the protocol type of the requesting-end-requested packet, the second proxy end sends the requesting-end-requested packet to an acknowledging end, where a requesting-end ip address and a requesting-end port in the requesting-end-requested packet are used as a source ip address and a source port.

Specifically, the requesting-end-requested packet includes requesting-end ip address, requesting-end port, acknowledging end ip address, and acknowledging end port. To realize transparent proxying of the proxy and the server, the proxy needs to use the requesting-end ip address and the requesting-end port in the requesting-end-requested packet as the source ip address and the source port. Further, the acknowledging end ip address and the acknowledging end port remain unchanged to allow the proxy end to establish a connection relationship with the acknowledging end, such that the acknowledging end believes that the access request is from the requesting end. Accordingly, the proxy may become transparent to the server under full ip protocol and specified network.

By the connection relationship between the first proxy end and the second proxy end, the second proxy end receives the requesting-end-requested packet and the protocol type of the requesting-end-requested packet. Using the requesting-end ip address and the requesting-end port in the requesting-end-requested packet as the source ip address and the source port, the second proxy end sends the requesting-end-requested packet to the acknowledging end. Further, the connection-tracking information between the second proxy end and the acknowledging end also needs to be established, and the connection-tracking information between the second proxy end and the acknowledging end needs to establish a mapping relationship with the aforementioned connection-tracking information between the first proxy end and the second proxy end. Such mapping relationship may need to be saved for facilitating subsequent receiving of the acknowledging-end-responded packet.

In some embodiments, when the protocol type is the connection-oriented protocol type, at Step S103: based on the connection-oriented protocol type, the second proxy end utilizes an ip_transparent option of the socket to establish a connection-oriented connection relationship with the acknowledging end, where the requesting-end ip address and the requesting-end port in the requesting-end-requested packet are used as the source ip address and the source port; the second proxy end further establishes connection-tracking information of the connection-oriented connection relationship between the second proxy end and the acknowledging end, and establishes and saves a mapping relationship between the connection-tracking information of the connection relationship between the second proxy end and the acknowledging end and the aforementioned connection-tracking information between the first proxy end and the second proxy end.

In some embodiments, when the protocol type is the connectionless protocol type, at Step S103: the second proxy end utilizes the ip_transparent option of the socket to directly send the requesting-end-requested packet to the acknowledging end based on the connectionless protocol type, where the requesting-end ip address and the requesting-end port in the requesting-end-requested packet are used as the source ip address and the source port; and the second proxy end further establishes connection-tracking information between the second proxy end and the acknowledging end, and establishes and saves a mapping relationship between the connection-tracking information between the second proxy end and the acknowledging end and the aforementioned connection-tracking information between the first proxy end and the second proxy end.

At S104: by configuring ospf service, iptables rules and routing rules, the second proxy guides and receives an acknowledging-end-responded packet, and sends the acknowledging-end-responded packet to the first proxy end.

Specifically, the ospf service runs at the second proxy end and at a switch of a corresponding acknowledging end, and the iptables rules and the routing rules are configured, thereby directing the acknowledgement packet responded by the acknowledging end to the requesting end to the second proxy end. The second proxy end obtains the connection relationship between the first proxy end and the second proxy end based on the mapping relationship that includes the connection-tracking information between the second proxy end and the acknowledging end, and sends the acknowledging-end-responded packet to the first proxy end through the connection relationship between the first proxy end and the second proxy end.

At S105: the first proxy end sends the acknowledging-end-responded packet to the requesting end.

Specifically, the first proxy end acquires the connection-tracking information between the first proxy end and the requesting end based on the mapping relationship that includes the connection-tracking information between the first proxy end and the second proxy end, and sends the acknowledging-end-responded packet to the requesting end through the connection-tracking information between the first proxy end and the requesting end.

In some embodiments, for the connection-oriented protocol type, the first proxy end acquires the connection relationship between the first proxy end and the requesting end based on the mapping relationship that includes the connection-tracking information between the first proxy end and the second proxy end. Further, the first proxy end sends the received acknowledging-end-responded packet to the requesting end through the connection relationship between the first proxy end and the requesting end.

In some embodiments, for the connectionless protocol type, the first proxy end acquires the connection-tracking information between the first proxy end and the requesting end based on the mapping relationship that includes the connection-tracking information between the first proxy end and the second proxy end. Further, based on such connection-tracking information between the first proxy end and the requesting end, the first proxy end sends the received acknowledging-end-responded packet to the requesting end through the raw packet.

Figure 2:
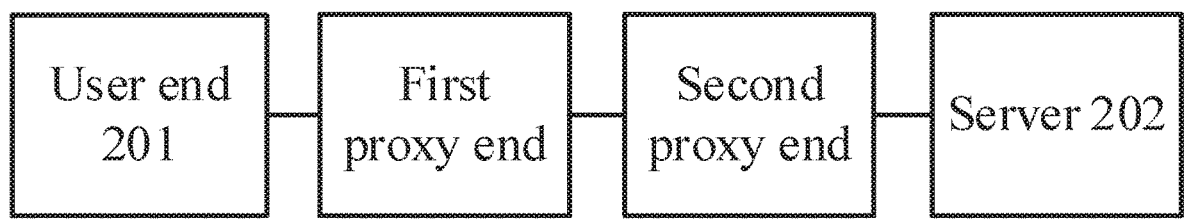
FIG. 2 illustrates a schematic view of an application scenario provided by Embodiment 1 of the present disclosure.
Figure 3:
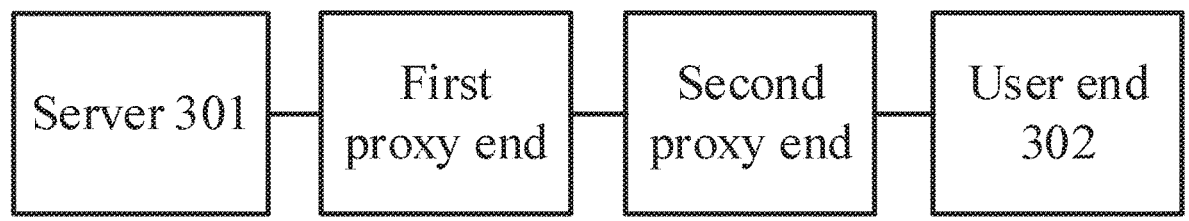
FIG. 3 illustrates a schematic view of another application scenario provided by Embodiment 1 of the present disclosure.

It should be noted that, the aforementioned requesting end may be a user-end (e.g., client), or may be a server (e.g., source server). Referring to FIG. 2 and FIG. 3, two specific application scenarios are provided.

In FIG. 2, when the aforementioned requesting end is a user end 201, the aforementioned acknowledging end is a server 202 that responds to user-end-requests. For example, if the user end 201 access video resources at the server 202, the user end 201 is then the access-requesting end and the server 202 is the acknowledging end that responds to the access request.

In FIG. 3, when the aforementioned requesting end is a server 301, the aforementioned acknowledging end is then a user end 302 that responds to requests from the server 301. For example, if the server 301 pushes pop-up window information to the user end 302, the server 301 is then the pushing requesting end and the user end 302 is the acknowledging end that responds to the pushing request.

It should be further noted that, the disclosed first proxy end and second proxy end may possess functions of each other. In operation, based on different proxying situations, bidirectional transparent proxying may be realized by enabling and disabling corresponding proxying functions of the first proxy end and second proxy end. Accordingly, the configuration can be easier and more convenient.

By differentiating different connection protocol types and adopting packet-processing approaches corresponding to the connection protocols, the present disclosure achieves the objective of making the proxy to be transparent to the user and server under the full ip protocol formed by the connection-oriented protocol and connectionless protocol.

By using the requesting-end ip address and the requesting-end port in the requesting-end-requested packet as the source ip address and the source port, the proxy enables the acknowledging end to believe that the access request is from the requesting end, thereby achieving the objective of making the proxy to be transparent to the server in specified network.

Embodiment 2

Figure 4:
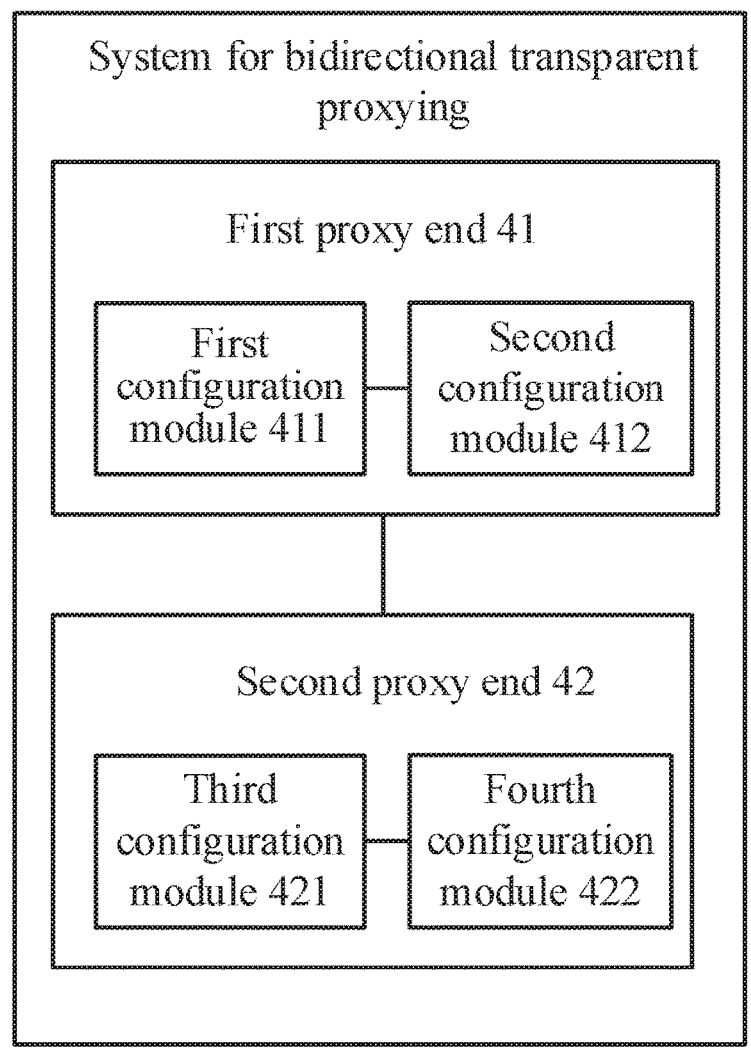
FIG. 4 illustrates a structural schematic view of a system for bidirectional transparent proxying according to Embodiment 2 of the present disclosure.

Referring to FIG. 4, the present disclosure provides a system for bidirectional transparent proxying, which is able to execute the method for bidirectional transparent proxying, provided in Embodiment 1. The disclosed system includes a first proxy end 41 and a second proxy end 42. The first proxy end 41 includes a first configuration module 411 and a second configuration module 412, and the second proxy end 42 includes a third configuration module 421 and a fourth configuration module 422.

The first configuration module 411 is configured for configuring iptables rules based on the protocol type of a requesting-end-requested packet and receiving the requesting-end-requested packet that is guided based on the iptables rules.

The second configuration module 412 is configured for sending the requesting-end-requested packet and the protocol type of the requesting-end-requested packet to the second proxy end 42.

The third configuration module 421 is configured for, based on the requesting-end-requested packet and the protocol type of the requesting-end-requested packet, sending the requesting-end-requested packet to an acknowledging end, where a requesting-end ip address and a requesting-end port in the requesting-end-requested packet are used as a source ip address and a source port.

The fourth configuration module 422 is configured for guiding and receiving an acknowledging-end-responded packet by configuring ospf service, iptables rules and routing rules, and sending the acknowledging-end-responded packet to the first proxy end 41.

The first configuration module 411 is further configured for sending the acknowledging-end-responded packet to the requesting end.

Further, when the protocol type of the requesting-end-requested packet is a connection-oriented protocol type, the first configuration module 411 is further configured for configuring iptables rules based on the connection-oriented protocol type, and utilizing a redirect mechanism of NetFilter to redirect the requesting-end-requested packet to the first proxy end 41, thereby establishing a connection-oriented connection relationship of first proxy end-requesting end.

Specifically, the first configuration module 411 may configure the iptables rules based on the connection-oriented protocol type, and uses the redirect mechanism of the NetFilter to redirect the client-requested packet to a listening port of the first proxy end 41 through redir ports, thereby establishing a connection-oriented connection relationship of first proxy end-requesting end between the first proxy end 41 and the requesting end. For example, when the connection-oriented protocol type is the TCP type, through the TCP protocol stack of the kernel, the three-way handshake with the requesting end may be completed automatically. While completing the establishment of the TCP connection, the connection-tracking information of the connection relationship of first proxy end—requesting end needs to be established, thereby facilitating subsequent receiving of the acknowledging-end-responded packet.

Further, when the protocol type of the requesting-end-requested packet is a connectionless protocol type, the first configuration module 411 is further configured for configuring iptables rules based on the connectionless protocol type, utilizing a mark mechanism of the NetFilter to mark the requesting-end-requested packet, and configuring routing rules to guide the marked requesting-end-requested packet to the first proxy end 41.

Specifically, the first configuration module 411 configures the iptables rules based on the connectionless protocol type, and uses the mark mechanism of the NetFilter to mark the requesting-end-requested packet. The first configuration module 411 further configures the routing rules to allow the marked packet to use a designated routing table for routing. Further, the routing rules are added to the designated routing table, such that the marked packet is guided to the first proxy end 41. The connection-tracking information between the first proxy end 41 and the requesting end is also established, which facilitates the subsequent receiving of the acknowledging-end-responded packet.

In some embodiments, when the connectionless protocol type is a UDP protocol type, the first configuration module 411 is further configured for utilizing a tproxy mechanism of the NetFilter to redirect the requesting-end-requested packet, marking the redirected requesting-end-requested packet, and configuring routing rules to guide the marked requesting-end-requested packet to the first proxy end 41.

In some embodiments, the second proxy end further needs to establish a connection relationship between the first proxy end 41 and the second proxy end 42, and through the connection relationship between the first proxy end 41 and the second proxy end 42, sends the requesting-end-requested packet and the protocol type of the requesting-end-requested packet to the second proxy end 42. Further, connection-tracking information of the connection relationship between the first proxy end 41 and the second proxy end 42 needs to be established, and a mapping relationship between the connection-tracking information of the connection relationship between the first proxy end 41 and the second proxy end 42 and the aforementioned connection-tracking information between the first proxy end 41 and the requesting end needs to be established and saved. Accordingly, the subsequent receiving of the acknowledging-end-responded packet may become easier.

In some embodiments, when the protocol type of the requesting-end-requested packet is a connection-oriented protocol type, the third configuration module 421 is further configured for, based on the connection-oriented protocol type, utilizing an ip_transparent option of the socket to establish a connection-oriented connection relationship with the acknowledging end, where the requesting-end ip address and the requesting-end port in the requesting-end-requested packet are used as the source ip address and the source port. The third configuration module 421 is further configured for sending the requesting-end-requested packet to the acknowledging end.

When the protocol type of the requesting-end-requested packet is a connectionless protocol type, the third configuration module 421 is further configured for, based on the connectionless protocol type, utilizing the ip_transparent option of the socket to directly send the requesting-end-requested packet to the acknowledging end, where the requesting-end ip address and the requesting-end port in the requesting-end-requested packet are used as the source ip address and the source port.

Specifically, by the connection relationship between the first proxy end 41 and the second proxy end 42, the third configuration module 421 receives the requesting-end-requested packet and the protocol type of the requesting-end-requested packet. Using the requesting-end ip address and the requesting-end port in the requesting-end-requested packet as the source ip address and the source port, the third configuration module 421 sends the requesting-end-requested packet to the acknowledging end. Further, the connection-tracking information between the second proxy end 42 and the acknowledging end also needs to be established, and the connection-tracking information between the second proxy end 42 and the acknowledging end needs to establish a mapping relationship with the aforementioned connection-tracking information between the first proxy end 41 and the second proxy end 42. Such mapping relationship may need to be saved for facilitating subsequent receiving of the acknowledging-end-responded packet.

In some embodiments, the fourth configuration module 422 configures ospf service at the second proxy end 42 and at a switch of a corresponding acknowledging end. The fourth configuration module 422 further configures the iptables rules and the routing rules to guide the acknowledgement packet responded by the acknowledging end to the requesting end to the second proxy end 42. The fourth configuration module 422 obtains the connection relationship between the first proxy end 41 and the second proxy end 42 based on the mapping relationship that includes the connection-tracking information between the second proxy end 42 and the acknowledging end. Through the connection relationship between the first proxy end 41 and the second proxy end 42, the fourth configuration module 422 sends the acknowledging-end-responded packet to the first proxy end 41.

In some embodiments, the first configuration module 411 further acquires the connection-tracking information between the first proxy end 41 and the requesting end based on the mapping relationship that includes the connection-tracking information between the first proxy end 41 and the second proxy end 42. Through the connection-tracking information between the first proxy end 41 and the requesting end, the first configuration module 411 sends the acknowledging-end-responded packet to the requesting end.

When the protocol type of the acknowledging-end-responded packet is the connection-oriented protocol type, the first configuration module 411 is further configured to acquire the connection relationship of first proxy end-requesting end based on the mapping relationship that includes the connection-tracking information between the first proxy end 41 and the second proxy end 42. Further, the first configuration module 411 sends the received acknowledging-end-responded packet to the requesting end through the connection relationship of first proxy end-requesting end.

When the protocol type of the packet responded by the acknowledging end is the connectionless protocol type, the first configuration module 411 is further configured to acquire the connection-tracking information between the first proxy end 41 and the requesting end based on the mapping relationship that includes the connection-tracking information between the first proxy end 41 and the second proxy end 42. Further, based on such connection-tracking information between the first proxy end 41 and the requesting end, the first configuration module 411 sends the received acknowledging-end-responded packet to the requesting end through the raw socket.

By differentiating different connection protocol types and adopting packet-processing approaches corresponding to the connection protocols, the present disclosure achieves the objective of making the proxy to be transparent to the user and server under the full ip protocol formed by the connection-oriented protocol and connectionless protocol.

By using the requesting-end ip address and the requesting-end port in the requesting-end-requested packet as the source ip address and the source port, the proxy enables the acknowledging end to believe that the access request is from the requesting end, thereby achieving the objective of making the proxy to be transparent to the server in specified network.

The sequence numbers of the embodiments of the present invention merely for ease of description, and do not imply the preference throughout the embodiments.

The above-described device embodiments are for illustrative purposes, units described as separated components may or may not be physically separated, and the components displayed as units may or may not be physical units. Based on practical demands, partial or entire modules may be selected to implement the objective of the present disclosure. For those ordinarily skilled in the relevant art, the present disclosure may be understood and implemented without contributing creative labor.

Through the foregoing description of the implementation manners, it is clear to those skilled in the relevant art that the present disclosure may be implemented by software plus a necessary universal hardware platform, and certainly may also be implemented by hardware, but in many cases, the software implementation is preferred. Based on such an understanding, the technical solutions of the present disclosure or the part that makes contributions to the existing technology may be substantially embodied in the form of a software product. The software product may be stored in a computer-readable storage medium, such as ROM/RAM, magnetic disk, or optical disc, and includes a plurality of commands to instruct a computer device (which may be a personal computer, a server, or a network device) to perform the method according to each or some portions of embodiments of the present disclosure.

The foregoing is only preferred implementations of the present disclosure, which does not intend to limit the present disclosure. Without departing from the spirit of the present disclosure, any modification, equivalent replacement or improvement shall all fall within the protection scope of the present disclosure.

What is claimed is:

1. A method for bidirectional transparent proxying, comprising:
configuring, by a first proxy end, iptables rules based on a protocol type of a requesting-end-requested packet, and receiving, by the first proxy end, the requesting-end-requested packet that is guided based on the iptables rules, wherein the requesting-end-requested packet is a packet requested by a requesting end;
sending, by the first proxy end, the requesting-end-requested packet and the protocol type of the requesting-end-requested packet to a second proxy end;
based on the requesting-end-requested packet and the protocol type of the requesting-end-requested packet, sending, by the second proxy end, the requesting-end-requested packet to an acknowledging end, wherein a requesting-end ip address and a requesting-end port in the requesting-end-requested packet are used as a source ip address and a source port;
by configuring ospf service, iptables rules and routing rules, guiding and receiving, by the second proxy end, an acknowledging-end-responded packet, and sending, by the second proxy end, the acknowledging-end-responded packet to the first proxy end, wherein the acknowledging-end-responded packet is a packet responded by the acknowledging end;
sending, by the first proxy end, the acknowledging-end-responded packet to the requesting end.

2. The method according to claim 1, wherein:
the protocol type of the requesting-end-requested packet is a connection-oriented protocol type, and
the configuring, by a first proxy end, iptables rules based on a protocol type of a requesting-end-requested packet, and receiving, by the first proxy end, the requesting-end-requested packet that is guided based on the iptables rules further comprises:
configuring, by the first proxy end, the iptables rules based on the connection-oriented protocol type, and utilizing, by the first proxy end, a redirect mechanism of NetFilter to redirect the requesting-end-requested packet to the first proxy end, thereby establishing a connection-oriented connection relationship between the first proxy end and the requesting end.

3. The method according to claim 1, wherein:
the protocol type of the requesting-end-requested packet is a connectionless protocol type, and
the configuring, by a first proxy end, iptables rules based on a protocol type of a requesting-end-requested packet, and receiving, by the first proxy end, the requesting-end-requested packet that is guided based on the iptables rules further comprises:
configuring, by the first proxy end, the iptables rules based on the connectionless protocol type, utilizing, by the first proxy end, a mark mechanism of the NetFilter to mark the requesting-end-requested packet, and configuring, by the first proxy end, routing rules to guide the marked requesting-end-requested packet to the first proxy end.

4. The method according to claim 3, wherein:
when the protocol type of the requesting-end-requested packet is the connectionless protocol type, the configuring, by the first proxy end, iptables rules based on the protocol type of the requesting-end-requested packet, and receiving, by the first proxy end, the requesting-end-requested packet that is guided based on the iptables rules further comprises:
when the connectionless protocol type is a UDP protocol type, utilizing, by the first proxy end, a tproxy mechanism of the NetFilter to redirect the requesting-end-requested packet, marking, by the first proxy end, the redirected requesting-end-requested packet, and configuring, by the first proxy end, routing rules to guide the marked requesting-end-requested packet to the first proxy end.

5. The method according to claim 1, wherein:
based on the requesting-end-requested packet and the protocol type of the requesting-end-requested packet, sending, by the second proxy end, the requesting-end-requested packet to an acknowledging end, wherein the requesting-end ip address and the requesting-end port in the requesting-end-requested packet are used as the source ip address and the source port further comprises:
when the protocol type of the requesting-end-requested packet is a connection-oriented protocol type, based on the connection-oriented protocol type, utilizing, by the second proxy end, an ip_transparent option of socket to establish a connection-oriented connection relationship with the acknowledging end, wherein the requesting-end ip address and the requesting-end port in the requesting-end-requested packet are used as the source ip address and the source port; and sending, by the second proxy end, the requesting-end-requested packet to the acknowledging end; or
when the protocol type of the requesting-end-requested packet is a connectionless protocol type, based on the connectionless protocol type, utilizing, by the second proxy end, the ip_transparent option of the socket to directly send the requesting-end-requested packet to the acknowledging end, wherein the requesting-end ip address and the requesting-end port in the requesting-end-requested packet are used as the source ip address and the source port.

6. The method according to claim 2, wherein:
when the protocol type of the acknowledging-end-responded packet is a connection-oriented protocol type, the sending, by the first proxy end, the received acknowledging-end-responded packet to the requesting end further comprises:
through the connection relationship between the first proxy end and the requesting end, sending, by the first proxy end, the received acknowledging-end-responded packet to the requesting end.

7. The method for bidirectional transparent proxying according to claim 3, wherein:
when the protocol type of the acknowledging-end-responded packet is a connectionless protocol type, the sending, by the first proxy end, the received acknowledging-end-responded packet to the requesting end further comprises:

through raw socket, sending, by the first proxy end, the received acknowledging-end-responded packet to the requesting end.

8. A system for bidirectional transparent proxying, comprising:
   a first proxy end and a second proxy end, the first proxy end including a first configuration module and a second configuration module, and the second proxy end including a third configuration module and a fourth configuration module;
   the first configuration module is configured for configuring iptables rules based on a protocol type of a requesting-end-requested packet, and receiving the requesting-end-requested packet that is guided based on the iptables rules, wherein the requesting-end-requested packet is a packet requested by a requesting end;
   the second configuration module is configured for sending the requesting-end-requested packet and the protocol type of the requesting-end-requested packet to the second proxy end;
   the third configuration module is configured for, based on the requesting-end-requested packet and the protocol type of the requesting-end-requested packet, sending the requesting-end-requested packet to an acknowledging end, wherein a requesting-end ip address and a requesting-end port in the requesting-end-requested packet are used as a source ip address and a source port;
   the fourth configuration module is configured for guiding and receiving an acknowledging-end-responded packet by configuring ospf service, iptables rules and routing rules, and sending the acknowledging-end-responded packet to the first proxy end, wherein the acknowledging-end-responded packet is a packet responded by the acknowledging end;
   the first configuration module is further configured for sending the received acknowledging-end-responded packet to the requesting end.

9. The system according to claim 8, wherein:
   when the protocol type of the requesting-end-requested packet is a connection-oriented protocol type, the first configuration module is further configured for configuring iptables rules based on the connection-oriented protocol type, and utilizing a redirect mechanism of NetFilter to redirect the requesting-end-requested packet to the first proxy end, thereby establishing a connection-oriented connection relationship between the first proxy end and the requesting end.

10. The system according to claim 8, wherein:
    when the protocol type of the requesting-end-requested packet is a connectionless protocol type, the first configuration module is further configured for configuring iptables rules based on the connectionless protocol type, utilizing a mark mechanism of the NetFilter to mark the requesting-end-requested packet, and configuring routing rules to guide the marked requesting-end-requested packet to the first proxy end.

11. The system according to claim 10, wherein:
    when the connectionless protocol type is a UDP protocol type, the first configuration module is further configured for utilizing a tproxy mechanism of the NetFilter to redirect the requesting-end-requested packet, marking the redirected requesting-end-requested packet, and configuring routing rules to guide the marked requesting-end-requested packet to the first proxy end.

12. The system according to claim 8, wherein:
    when the protocol type of the requesting-end-requested packet is a connection-oriented protocol type, the third configuration module is further configured for, based on the connection-oriented protocol type, utilizing an ip_transparent option of socket to establish a connection-oriented connection relationship with the acknowledging end, wherein a requesting-end ip address and a requesting-end port in the requesting-end-requested packet are used as a source ip address and a source port; and sending the requesting-end-requested packet to the acknowledging end; and
    when the protocol type of the requesting-end-requested packet is a connectionless protocol type, the third configuration module is further configured for utilizing the ip_transparent option of the socket to directly send the requesting-end-requested packet to the acknowledging end based on the connectionless protocol type, wherein the requesting-end ip address and the requesting-end port in the requesting-end-requested packet are used as the source ip address and the source port.

13. The system according to claim 9, wherein:
    when the protocol type of the acknowledging-end-responded packet is the connection-oriented protocol type, the first configuration module is further configured for, through the connection relationship between the first proxy end and the requesting end, sending the received acknowledging-end-responded packet to the requesting end.

14. The system according to claim 10, wherein:
    when the protocol type of the acknowledging-end-responded packet is the connectionless protocol type, the first configuration module is further configured for, through raw socket, sending the received acknowledging-end-responded packet to the requesting end.

\* \* \* \* \*